United States Patent
Huang et al.

(10) Patent No.: US 9,483,079 B2
(45) Date of Patent: Nov. 1, 2016

(54) FRAME STRUCTURE FOR FIXING PANELS WITH DIFFERENT SIZES AND PANEL DEVICE THEREWITH

(71) Applicant: Wistron Corporation, New Taipei (TW)

(72) Inventors: Yu-Hsin Huang, New Taipei (TW); Kuang-Wen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 362 days.

(21) Appl. No.: 14/246,151

(22) Filed: Apr. 7, 2014

(65) Prior Publication Data

US 2015/0192959 A1  Jul. 9, 2015

(30) Foreign Application Priority Data

Jan. 7, 2014  (TW) .............................. 103200296 U

(51) Int. Cl.
*G06F 1/16* (2006.01)
*F16M 11/04* (2006.01)

(52) U.S. Cl.
CPC .......... *G06F 1/1637* (2013.01); *F16M 11/041* (2013.01); *Y10T 403/602* (2015.01)

(58) Field of Classification Search
CPC .... F16M 11/10; F16M 11/041; F16M 13/00; F16M 13/02; F16M 13/022; B60R 11/0241; B60R 11/0252; B60R 2011/0066; B60R 2011/0071; B60R 2011/0078
See application file for complete search history.

(56) References Cited

U.S. PATENT DOCUMENTS

| | | | | |
|---|---|---|---|---|
| 5,154,380 A * | 10/1992 | Risca | ................ | A47G 23/0216 248/154 |
| 5,398,898 A * | 3/1995 | Bever | ................ | A47G 23/0225 248/154 |
| 5,560,578 A * | 10/1996 | Schenken | .............. | B60N 3/106 248/229.21 |
| 6,375,134 B1 * | 4/2002 | Goldschmidt | ......... | A47G 19/08 248/154 |
| 6,644,615 B1 * | 11/2003 | Liu | .......... | B66F 13/00 248/346.07 |
| 7,828,259 B2 * | 11/2010 | Wang | ...................... | B60R 11/02 248/316.4 |
| 8,240,628 B2 * | 8/2012 | Huang | .................. | F16M 11/04 248/122.1 |
| 8,264,827 B2 * | 9/2012 | Yuan | ..................... | F16B 5/0642 248/229.12 |
| 8,789,800 B2 * | 7/2014 | Liu | ......... | F16M 13/00 248/122.1 |
| 8,833,716 B2 * | 9/2014 | Funk | ..................... | F16M 13/02 248/309.1 |
| 2007/0040089 A1 * | 2/2007 | Shiff | ...................... | A47B 97/04 248/448 |
| 2012/0193496 A1 * | 8/2012 | Li | ........................ | F16M 11/041 248/316.1 |

FOREIGN PATENT DOCUMENTS

TW           I271140           1/2007

* cited by examiner

*Primary Examiner* — Daniel Wiley
(74) *Attorney, Agent, or Firm* — Winston Hsu; Scott Margo

(57) ABSTRACT

A frame structure includes a holding plate, a first supporting member, a first driving member, a second supporting member and a second driving member. The holding plate is for holding a first panel. The first supporting member is slidably disposed on the holding plate. The first driving member connects the holding plate and the first supporting member and drives the first supporting member to slide relative to the holding plate along a first direction, so as to clamp a first corner of the first panel. The second supporting member is slidably disposed on the holding plate and opposite to the first supporting member. The second driving member connects the holding plate and the second supporting member and drives the second supporting member to slide relative to the holding plate along a second direction, so as to clamp a second corner of the first panel.

20 Claims, 6 Drawing Sheets

FRAME STRUCTURE FOR FIXING PANELS WITH DIFFERENT SIZES AND PANEL DEVICE THEREWITH

BACKGROUND OF THE INVENTION

1. Field of the Invention

The present invention relates to a frame structure and a panel device therewith, and more particularly, to a frame structure for fixing panels with different sizes and a panel device therewith.

2. Description of the Prior Art

With development of technology, an All-In-On computer has been gradually implemented in most people's daily life for dealing with documenting affairs, playing films, playing video games and so on. In process of manufacture, the All-In-On computer needs different panel modules with different sizes to yield to a vendor's ability, product specification and so on. Accordingly, it needs different frame structures with corresponding sizes for fixing the aforesaid panel modules with different sizes. Practically, it needs a plurality of tooling to manufacture the above-mentioned panel modules with different sizes, so as to greatly increase manufacturing cost and to result in disadvantage of the product in the market.

SUMMARY OF THE INVENTION

Thus, the present invention provides a frame structure for fixing panels with different sizes and a panel device therewith for solving above drawbacks.

According to an embodiment of the present invention, a frame structure includes a holding plate, a first supporting member, a first driving member, a second supporting member and a second driving member. The holding plate is for holding a first panel or a second panel. The first supporting member is disposed on the holding plate in a slidable manner. The first driving member connects the holding plate and the first supporting member and for driving the first supporting member to slide relative to the holding plate along a first direction, so as to clamp a first corner of the first panel or a first nook of the second panel. The second supporting member is disposed on the holding plate in a slidable manner and opposite to the first supporting member. The second driving member connects the holding plate and the second supporting member and for driving the second supporting member to slide relative to the holding plate along a second direction opposite to the first direction, so as to clamp a second corner opposite to the first corner of the first panel or a second nook opposite to the first nook of the second panel.

According to another embodiment of the present invention, a first opening is formed on the first supporting member, and a second opening is formed on the second supporting member. The frame structure includes two first hooks and two second hooks. One of the two first hooks is disposed on the holding plate and installed inside the first opening for hooking an end of the first driving member, and the other one of the two first hooks is disposed on the first supporting member for hooking the other end of the first driving member. One of the two second hooks is disposed on the holding plate and installed inside the second opening for hooking an end of the second driving member, and the other one of the two first hooks is disposed on the second supporting member for hooking the other end of the second driving member.

According to another embodiment of the present invention, at least one first screwing hole is formed on the first supporting member and corresponds to at least one first corner hole on the first corner of the first panel or to at least one first nook hole on the first nook of the second panel, and at least one second screwing hole is formed on the second supporting member and corresponds to at least one second corner hole on the second corner of the first panel or to at least one second nook hole on the second nook of the second panel.

According to another embodiment of the present invention, at least one first sliding slot is formed on the first supporting member, and at least one second sliding slot is formed on the second supporting member. The frame structure further includes at least one first guiding structure and at least one second guiding structure. The at least one first guiding structure is disposed on the holding plate, and the at least one first guiding structure is oriented parallel to the first direction and slidably disposed inside the at least one first sliding slot. The at least one second guiding structure is disposed on the holding plate and opposite to the at least one first guiding structure. The at least one second guiding structure is oriented parallel to the second direction and slidably disposed inside the at least one second sliding slot.

According to another embodiment of the present invention, a first bending structure is formed on a periphery of the at least one first sliding slot, and the at least one first guiding structure includes a first protruding portion and a first engaging portion. The first protruding portion protrudes from the holding plate and is for slidably abutting against the first bending structure. The first engaging portion protrudes from the first protruding portion and is for slidably engaging with the first bending structure.

According to another embodiment of the present invention, a second bending structure is formed on a periphery of the at least one second sliding slot, and the at least one second guiding structure includes a second protruding portion and a second engaging portion. The second protruding portion protrudes from the holding plate and is for slidably abutting against the second bending structure. The second engaging portion protrudes from the second protruding portion and is for slidably engaging with the second bending structure.

According to another embodiment of the present invention, the frame structure further includes a third supporting member and a third driving member. The third supporting member is disposed on the holding plate in a slidable manner and adjacent to the first supporting member and the second supporting member. The third driving member connects the holding plate and the third supporting member and is for driving the third supporting member to slide relative to the holding plate along a third direction, so as to clamp a third corner of the first panel or a third nook of the second panel.

According to another embodiment of the present invention, a third opening is formed on the third supporting member, and the frame structure further includes two third hooks. One of the two third hooks is disposed on the holding plate and installed inside the third opening for hooking an end of the third driving member. The other one of the two third hooks is disposed on the third supporting member for hooking the other end of the third driving member.

According to another embodiment of the present invention, at least one third screwing hole is formed on the third supporting member and corresponds to at least one third corner hole on the third corner of the first panel or to at least one third nook hole on the third nook of the second panel.

According to another embodiment of the present invention, at least one third sliding slot is formed on the third supporting member, and the frame structure further includes at least one third guiding structure disposed on the holding plate. The at least one third guiding structure is oriented parallel to the third direction and slidably disposed inside the at least one third sliding slot.

According to another embodiment of the present invention, a third bending structure is formed on a periphery of the at least one third sliding slot, and the at least one third guiding structure includes a third protruding portion and a third engaging portion. The third protruding portion protrudes from the holding plate and is for slidably abutting against the third bending structure. The third engaging portion protrudes from the third protruding portion and is for slidably engaging with the third bending structure.

According to another embodiment of the present invention, the frame structure further includes a fourth supporting member and a fourth driving member. The fourth supporting member is disposed on the holding plate in a slidable manner and opposite to the third supporting member. The fourth driving member connects the holding plate and the fourth supporting member and is for driving the fourth supporting member to slide relative to the holding plate along a fourth direction opposite to the third direction, so as to clamp a fourth corner opposite to the third corner of the first panel or a fourth nook opposite to the third nook of the second panel.

According to another embodiment of the present invention, a fourth opening is formed on the fourth supporting member, and the frame structure further includes two fourth hooks. One of the two fourth hooks is disposed on the holding plate and installed inside the fourth opening for hooking an end of the fourth driving member, and the other one of the two fourth hooks is disposed on the fourth supporting member for hooking the other end of the fourth driving member.

According to another embodiment of the present invention, at least one fourth screwing hole is formed on the fourth supporting member and corresponds to at least one fourth corner hole on the fourth corner of the first panel or to at least one fourth nook hole on the fourth nook of the second panel.

According to another embodiment of the present invention, at least one fourth sliding slot is formed on the fourth supporting member, and the frame structure further includes at least one fourth guiding structure disposed on the holding plate and opposite to the at least one third guiding structure. The at least one fourth guiding structure is oriented parallel to the fourth direction and slidably disposed inside the at least one fourth sliding slot.

According to another embodiment of the present invention, a fourth bending structure is formed on a periphery of the at least one fourth sliding slot, and the at least one fourth guiding structure includes a fourth protruding portion and a fourth engaging portion. The fourth protruding portion protrudes from the holding plate and is for slidably abutting against the fourth bending structure. The fourth engaging portion protrudes from the fourth protruding portion and is for slidably engaging with the fourth bending structure.

According to another embodiment of the present invention, a panel device includes a first panel and a frame structure for fixing the first panel. The frame structure includes a holding plate, a first supporting member, a first driving member, a second supporting member and a second driving member. The holding plate is for holding the first panel. The first supporting member is disposed on the holding plate in a slidable manner. The first driving member connects the holding plate and the first supporting member and is for driving the first supporting member to slide relative to the holding plate along a first direction, so as to clamp a first corner of the first panel. The second supporting member is disposed on the holding plate in a slidable manner and opposite to the first supporting member. The second driving member connects the holding plate and the second supporting member and is for driving the second supporting member to slide relative to the holding plate along a second direction opposite to the first direction, so as to clamp a second corner opposite to the first corner of the first panel.

In summary, the first supporting member and the second supporting member of the present invention are slidably disposed on the holding plate, and the first driving member and the second driving member are utilized for driving the first supporting member and the second supporting member to approach the first panel, such that the first supporting member and the second supporting member clamp the first panel. As a result, when the first panel is desired to be replaced, the first supporting member and the second supporting member can be pulled away from the first panel for detaching the first panel from the frame structure. Thus, the second panel with different sizes can be installed onto the holding plate of the frame structure. In such a manner, the frame structure of the present invention can be used for fixing panels with different sizes for saving manufacturing cost of the frame structure, so as to enhance advantages of the product in the market.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
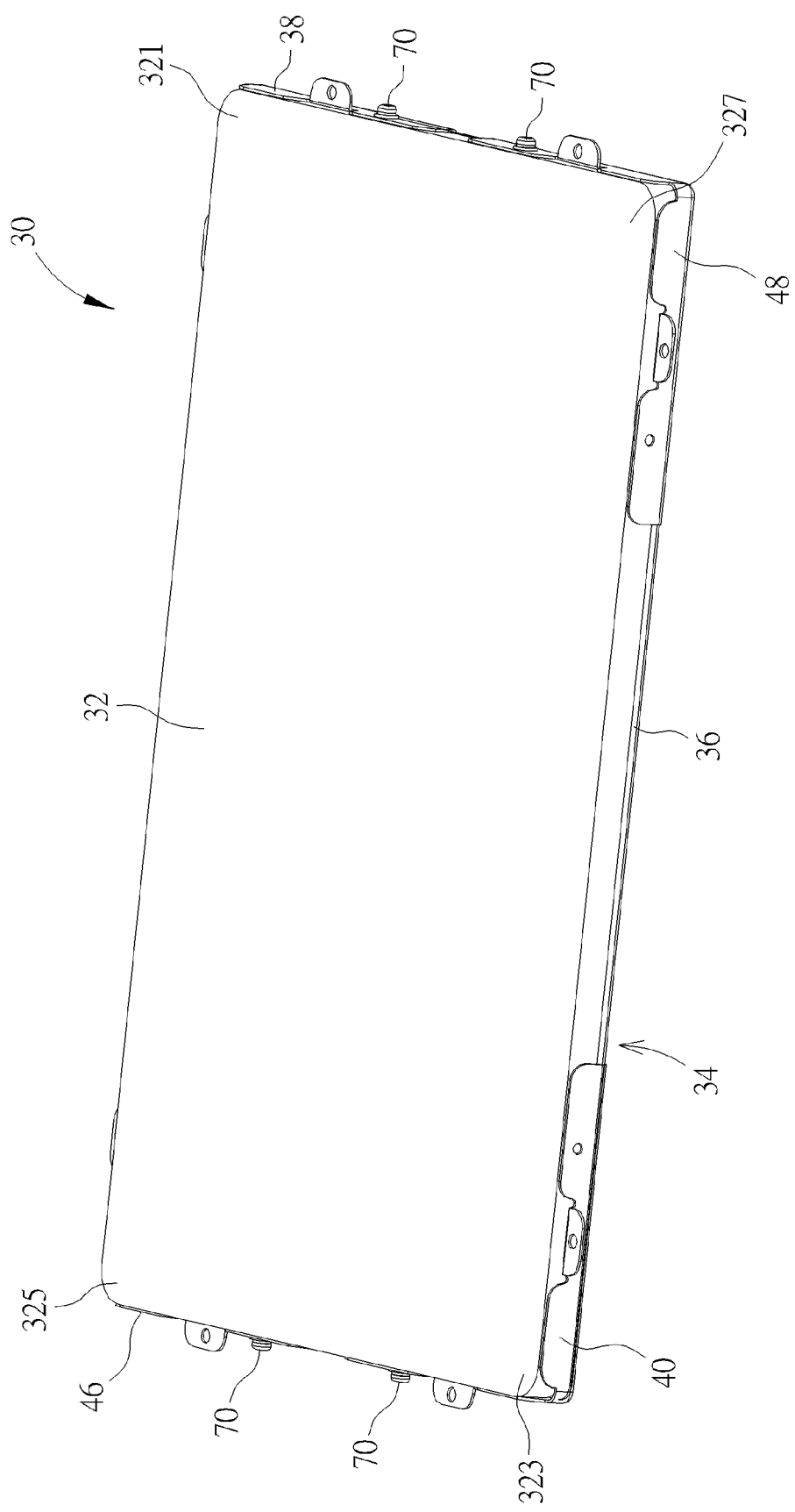
FIG. 1 is a schematic diagram of a panel device according to an embodiment of the present invention.
Figure 2:
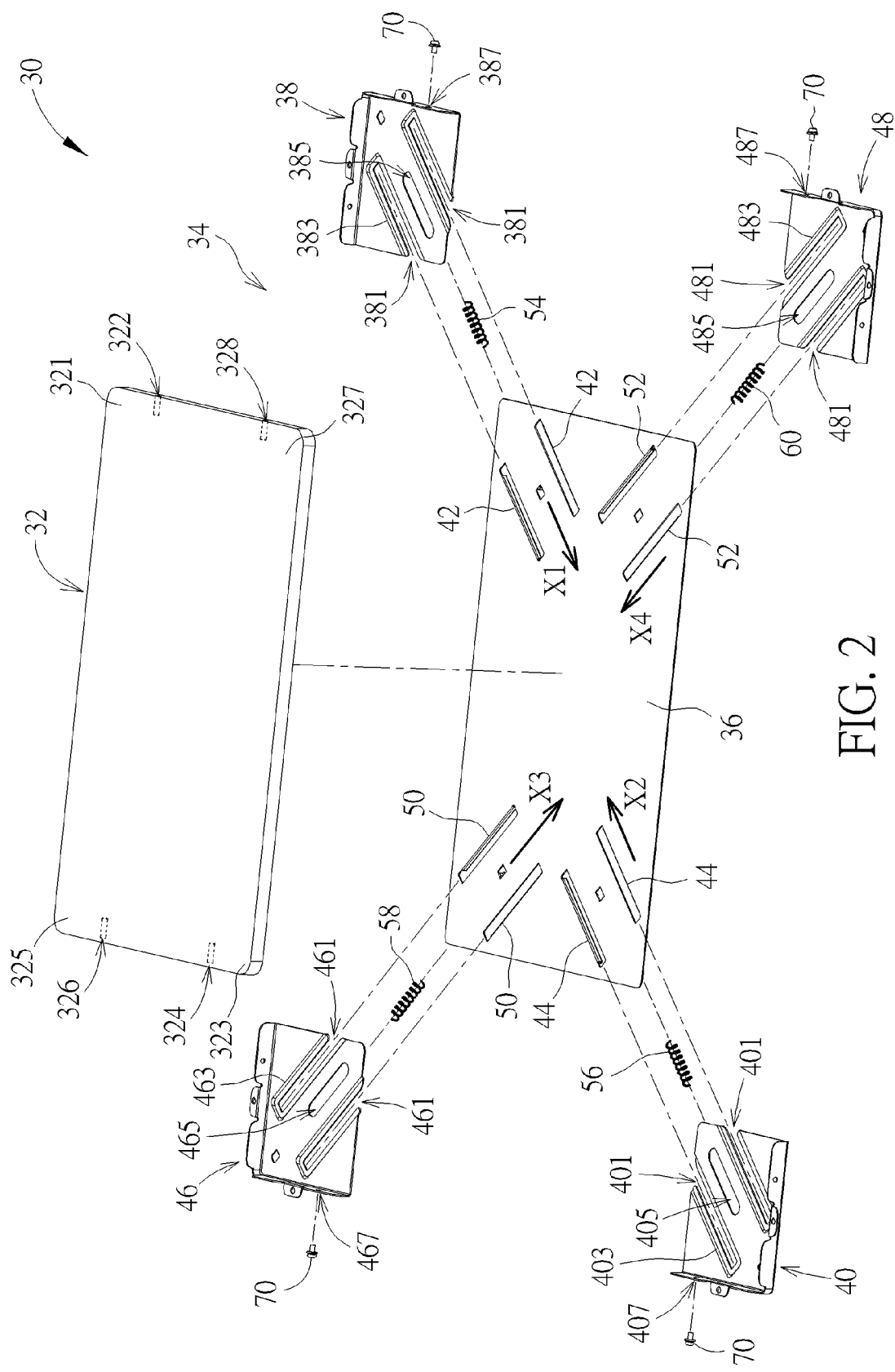
FIG. 2 is an exploded diagram of the panel device according to the embodiment of the present invention.

Please refer to FIG. 1 and FIG. 2. FIG. 1 is a schematic diagram of a panel device 30 according to an embodiment of the present invention. FIG. 2 is an exploded diagram of the panel device 30 according to the embodiment of the present invention. As shown in FIG. 1 and FIG. 2, the panel device 30 includes a first panel 32 and a frame structure 34. The frame structure 34 is used for fixing the first panel 32. Accordingly, the first panel 32 can display an operating interface for a user to operate. In this embodiment, the first panel 32 can be a touch control panel module, but the present invention is not limited thereto. For example, the first panel 32 can be a liquid crystal display module as well.

Figure 3:
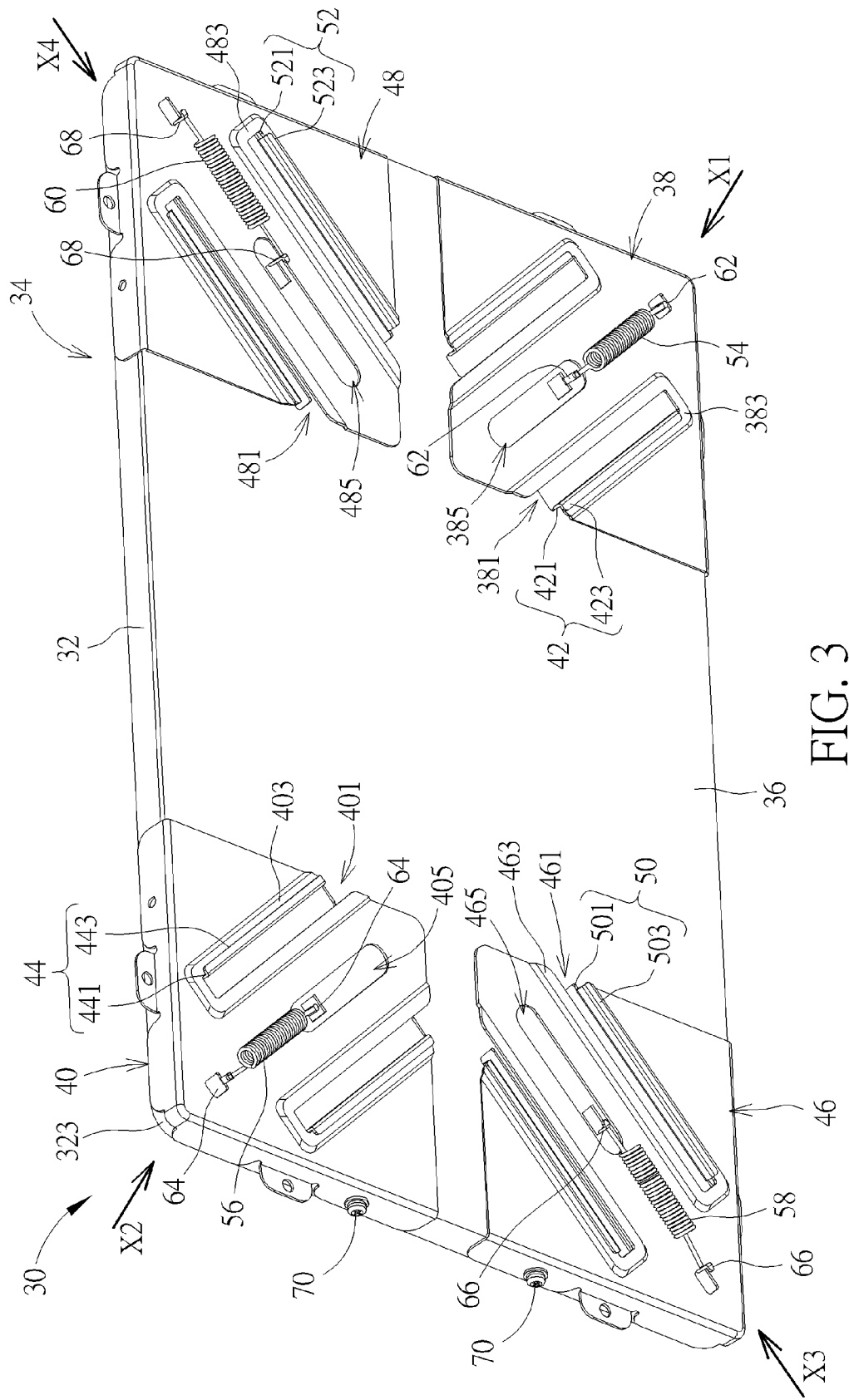
FIG. 3 is a diagram of the panel device in another view according to the embodiment of the present invention.
Figure 4:
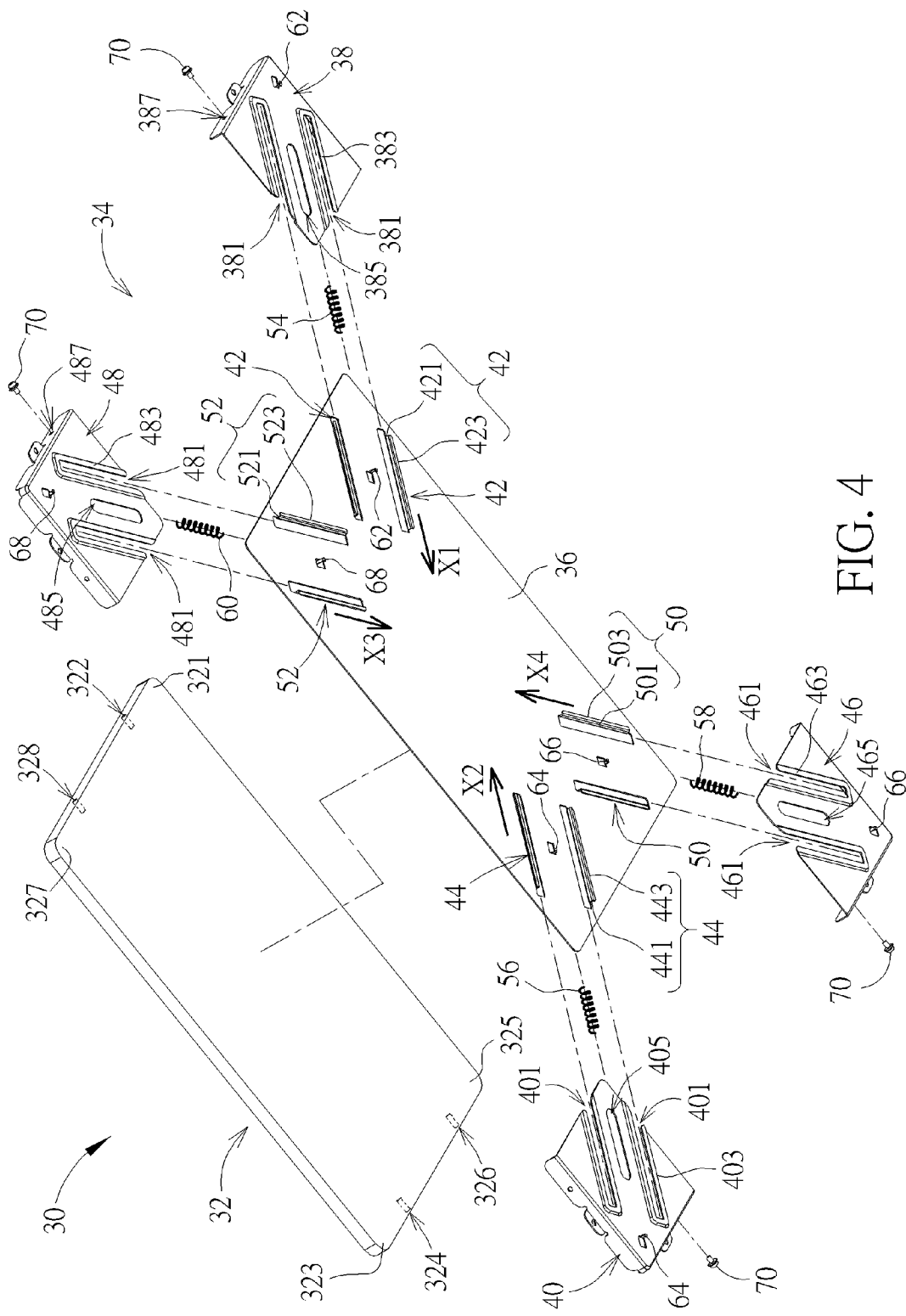
FIG. 4 is an exploded diagram of the panel device in another view according to the embodiment of the present invention.

Please refer to FIG. 3 and FIG. 4. FIG. 3 is a diagram of the panel device 30 in another view according to the embodiment of the present invention. FIG. 4 is an exploded diagram of the panel device 30 in another view according to the embodiment of the present invention. As shown in FIG. 3 and FIG. 4, the frame structure 34 includes a holding plate 36, a first supporting member 38 and a second supporting member 40. The holding plate 36 is used for holding the first panel 32, and the second supporting member 40 is opposite to the first supporting member 38. In this embodiment, the second supporting member 40 and the first supporting member 38 can be disposed on two opposite corners of the holding plate 36, respectively, but the present invention is not limited thereto. For example, the second supporting member 40 and the first supporting member 38 can be disposed on two opposite lateral sides of the holding plate 36 as well.

Furthermore, at least one first sliding slot 381 is formed on the first supporting member 38, and at least one second sliding slot 401 is formed on the second supporting member 40. The frame structure 34 further includes at least one first guiding structure 42 and at least one second guiding structure 44. The first guiding structure 42 is disposed on the holding plate 36 and substantially oriented parallel to a first direction X1 shown in FIG. 2. The second guiding structure 44 is disposed on the holding plate 36 and opposite to the first guiding structure 42, and the second guiding structure 44 is substantially oriented parallel to a second direction X2 opposite to the first direction X1, as shown in FIG. 2. In this embodiment, there can be two first sliding slots 381 formed on the first supporting member 38, two second sliding slots 401 formed on the second supporting member 40, and the frame structure 34 can include two first guiding structures 42 and two second guiding structures 44, correspondingly. Amounts and locations of the first sliding slot 381, the second sliding slot 401, the first guiding structure 42 and the second guiding structure 44 are not limited to those illustrated in figures in this embodiment.

When the first supporting member 38 and the holding plate 36 are assembled, the first guiding structure 42 is slidably disposed inside the first sliding slot 381, such that the first supporting member 38 is disposed on the holding plate 36 in a slidable manner. Accordingly, the first supporting member 38 is capable of sliding on the holding plate 36 along the first direction X1 or along the second direction X2 opposite to the first direction X1. When the second supporting member 40 and the holding plate 36 are assembled, the second guiding structure 44 is slidably disposed inside the second sliding slot 401, such that the second supporting member 40 is disposed on the holding plate 36 in a slidable manner. Accordingly, the second supporting member 40 is capable of sliding on the holding plate 36 along the first direction X1 or along the second direction X2 opposite to the first direction X1. Furthermore, a first bending structure 383 is formed on a periphery of the first sliding slot 381 for enhancing structural strength of the first sliding slot 381, and a second bending structure 403 is formed on a periphery of the second sliding slot 401 for enhancing strength of the second sliding slot 401.

In addition, the first guiding structure 42 includes a first protruding portion 421 and a first engaging portion 423. The first protruding portion 421 protrudes from the holding plate 36, and the first engaging portion 423 protrudes from the first protruding portion 421. In this embodiment, the first protruding portion 421 can be substantially perpendicular to the first engaging portion 423, but the present invention is not limited thereto. When the first supporting member 38 is assembled on the holding plate 36, the first protruding portion 421 is used for slidably abutting against the first bending structure 383, such that the first supporting member 38 slides relative to the holding plate 36, and the first engaging portion 423 is used for slidably engaging with the first bending structure 383, so as to prevent the first supporting member 38 from separating from the holding plate 36.

Furthermore, the second guiding structure 44 includes a second protruding portion 441 and a second engaging portion 443. The second protruding portion 441 protrudes from the holding plate 36, and the second engaging portion 443 protrudes from the second protruding portion 441. In this embodiment, the second protruding portion 441 can be substantially perpendicular to the first engaging portion 423, but the present invention is not limited thereto. When the second supporting member 40 is assembled on the holding plate 36, the second protruding portion 441 is used for slidably abutting against the second bending structure 403, such that the second supporting member 40 slides relative to the holding plate 36, and the second engaging portion 443 is used for slidably engaging with the second bending structure 403, so as to prevent the second supporting member 40 from separating from the holding plate 36.

As shown in FIG. 3 and FIG. 4, the frame structure 34 further includes a third supporting member 46 and a fourth supporting member 48. The third supporting member 46 is adjacent to the first supporting member 38 and the second supporting member 40, and the fourth supporting member 48 is opposite to the third supporting member 46. Furthermore, at least one third sliding slot 461 is formed on the third supporting member 46, and at least one fourth sliding slot 481 is formed on the fourth supporting member 48. The frame structure 34 further includes at least one third guiding structure 50 and at least one fourth guiding structure 52. The third guiding structure 50 is disposed on the holding plate 36 and substantially oriented parallel to a third direction X3 shown in FIG. 2. The fourth guiding structure 52 is disposed on the holding plate 36 and opposite to the third guiding structure 50. The fourth guiding structure 52 is substantially oriented parallel to a fourth direction X4 opposite to the third direction X3, as shown in FIG. 3. In this embodiment, there can be two third sliding slots 461 on the third supporting member 46 and two fourth sliding slots 481 on the fourth supporting member 48. The frame structure 34 can include two third guiding structures 50 and two fourth guiding structures 52, correspondingly. Amounts and locations of the third sliding slot 461, the fourth sliding slot 481, the third guiding structure 50 and the fourth guiding structure 52 are not limited to those illustrated in figures in this embodiment.

When the third supporting member 46 and the holding plate 36 are assembled, the third guiding structure 50 is slidably disposed inside the third sliding slot 461, such that the third supporting member 46 is disposed on the holding plate 36 in a slidable manner. Accordingly, the third supporting member 46 is capable of sliding on the holding plate 36 along the third direction X3 or along the fourth direction X4 opposite to the third direction X3. When the fourth supporting member 48 and the holding plate 36 are assembled, the fourth guiding structure 52 is slidably disposed inside the fourth sliding slot 481, such that the fourth supporting member 48 is disposed on the holding plate 36 in a slidable manner. Accordingly, the fourth supporting member 48 is capable of sliding on the holding plate 36 along the third direction X3 or along the fourth direction X4 opposite to the third direction X3. Furthermore, a third bending structure 463 is formed on a periphery of the third sliding slot 461 for enhancing structural strength of the third sliding slot 461, and a fourth bending structure 483 is formed on a periphery of the fourth sliding slot 481 for enhancing strength of the fourth sliding slot 481.

Furthermore, the third guiding structure 50 includes a third protruding portion 501 and a third engaging portion 503. The third protruding portion 501 protrudes from the holding plate 36, and the third engaging portion 503 protrudes from the third protruding portion 501. In this embodiment, the third protruding portion 501 can be substantially perpendicular to the third engaging portion 503, but the present invention is not limited thereto. When the third supporting member 46 is assembled on the holding plate 36, the third protruding portion 501 is used for slidably abutting against the third bending structure 463, such that the third supporting member 46 slides relative to the holding plate 36, and the third engaging portion 503 is used for slidably engaging with the third bending structure 463, so as to prevent the third supporting member 46 from separating from the holding plate 36.

Furthermore, the fourth guiding structure 52 includes a fourth protruding portion 521 and a fourth engaging portion 523. The fourth protruding portion 521 protrudes from the holding plate 36, and the fourth engaging portion 523 protrudes from the fourth protruding portion 521. In this embodiment, the fourth protruding portion 521 can be substantially perpendicular to the fourth engaging portion 523, but the present invention is not limited thereto. When the fourth supporting member 48 is assembled on the holding plate 36, the fourth protruding portion 521 is used for slidably abutting against the fourth bending structure 483, such that the fourth supporting member 48 slides relative to the holding plate 36, and the fourth engaging portion 523 is used for slidably engaging with the fourth bending structure 483, so as to prevent the fourth supporting member 48 from separating from the holding plate 36.

As shown in FIG. 1 to FIG. 4, the frame structure 34 further includes a first driving member 54, a second driving member 56, a third driving member 58 and a fourth driving member 60. The first driving member 54 connects the holding plate 36 and the first supporting member 38. The second driving member 56 connects the holding plate 36 and the second supporting member 40. The third driving member 58 connects the holding plate 36 and the third supporting member 46. The fourth driving member 60 connects the holding plate 36 and the fourth supporting member 48. In this embodiment, the first driving member 54, the second driving member 56, the third driving member 58 and the fourth driving member 60 can be a spring, respectively, but the present invention is not limited thereto.

Furthermore, a first opening 385 is formed on the first supporting member 38, and a second opening 405 is formed on the second supporting member 40. The frame structure 34 further includes two first hooks 62 and two second hooks 64. One of the two first hooks 62 is disposed on the holding plate 36 and installed inside the first opening 385 for hooking an end of the first driving member 54. The other one of the two first hooks 62 is disposed on the first supporting member 38 for hooking the other end of the first driving member 54. Accordingly, the first driving member 54 is capable of providing a resilient force for driving the first supporting member 38 to slide relative to the holding plate 36 along the first direction X1 when the first supporting member 38 moves relative to the holding plate 36 along the second direction X2 opposite to the first direction X1, so as to clamp a first corner 321 of the first panel 32. The first opening 385 provides an escaping space for preventing the first supporting member 38 and the first hook 62 from interference when the first supporting member 38 moves along the first direction X1 or the second direction X2.

Furthermore, one of the two second hooks 64 is disposed on the holding plate 36 and installed inside the second opening 405 for hooking an end of the second driving member 56. The other one of the two second hooks 64 is disposed on the second supporting member 40 for hooking the other end of the second driving member 56. Accordingly, the second driving member 56 is capable of providing a resilient force for driving the second supporting member 40 to slide relative to the holding plate 36 along the second direction X2 when the second supporting member 40 moves relative to the holding plate 36 along the first direction X1 opposite to the second direction X2, so as to clamp a second corner 323 of the first panel 32. The second opening 405 provides an escaping space for preventing the second supporting member 40 and the second hook 64 from interference when the second supporting member 40 moves along the first direction X1 or the second direction X2.

In addition, a third opening 465 is formed on the third supporting member 46, and a fourth opening 485 is formed on the fourth supporting member 48. The frame structure 34 further includes two third hooks 66 and two fourth hooks 68. One of the two third hooks 66 is disposed on the holding plate 36 and installed inside the third opening 465 for hooking an end of the third driving member 58. The other one of the two third hooks 66 is disposed on the third supporting member 46 for hooking the other end of the third driving member 58. Accordingly, the third driving member 58 is capable of providing a resilient force for driving the third supporting member 46 to slide relative to the holding plate 36 along the third direction X3 when the third supporting member 46 moves relative to the holding plate 36 along the fourth direction X4 opposite to the third direction X3, so as to clamp a third corner 325 of the first panel 32. The third opening 465 provides an escaping space for preventing the third supporting member 46 and the third hook 66 from interference when the third supporting member 46 moves along the third direction X3 or the fourth direction X4.

Furthermore, one of the two fourth hooks 68 is disposed on the holding plate 36 and installed inside the fourth opening 485 for hooking an end of the fourth driving member 60. The other one of the two fourth hooks 68 is disposed on the fourth supporting member 48 for hooking the other end of the fourth driving member 60. Accordingly, the fourth driving member 60 is capable of providing a resilient force for driving the fourth supporting member 48 to slide relative to the holding plate 36 along the fourth direction X4 when the fourth supporting member 48 moves relative to the holding plate 36 along the third direction X3 opposite to the fourth direction X4, so as to clamp a fourth corner 327 of the first panel 32. The fourth opening 485 provides an escaping space for preventing the fourth supporting member 48 and the fourth hook 68 from interference when the fourth supporting member 48 moves along the third direction X3 or the fourth direction X4.

As shown in FIG. 1 to FIG. 4, at least one first screwing hole 387 is formed on the first supporting member 38 and corresponds to at least one first corner hole 322 on the first corner 321 of the first panel 32. When the first supporting member 38 clamps the first corner 321 of the first panel 32, a screw component 70 is utilized for screwing the first corner hole 322 after passing through the first screwing hole 387, so as to fix the first supporting member 38 onto the first corner 321 of the first panel 32. At least one second screwing hole 407 is formed on the second supporting member 40 and corresponds to at least one second corner hole 324 on the second corner 323 of the first panel 32. When the second supporting member 40 clamps the second corner 323 of the first panel 32, the screw component 70 is utilized for screwing the second corner hole 324 after passing through the second screwing hole 407, so as to fix the second supporting member 40 onto the second corner 323 of the first panel 32.

Furthermore, at least one third screwing hole 467 is formed on the third supporting member 46 and corresponds to at least one third corner hole 326 on the third corner 325 of the first panel 32. When the third supporting member 46 clamps the third corner 325 of the first panel 32, the screw component 70 is utilized for screwing the third corner hole 326 after passing through the third screwing hole 467, so as to fix the third supporting member 46 onto the third corner 325 of the first panel 32. At least one fourth screwing hole 487 is formed on the fourth supporting member 48 and corresponds to at least one fourth corner hole 328 on the fourth corner 327 of the first panel 32. When the fourth supporting member 48 clamps the fourth corner 327 of the first panel 32, the screw component 70 is utilized for screwing the fourth corner hole 328 after passing through the fourth screwing hole 487, so as to fix the fourth supporting member 48 onto the fourth corner 327 of the first panel 32.

In this embodiment, there can be one first screwing hole 387 formed on the first supporting member 38, one second screwing hole 407 formed on the second supporting member 40, one third screwing hole 467 formed on the third supporting member 46 and one fourth screwing hole 487 on the fourth supporting member 48. Amounts and locations of the first screwing hole 387, the second screwing hole 407, the third screwing hole 467 and the fourth screwing hole 487 are not limited to those illustrated in figures in this embodiment, and it depends on practical demands.

Figure 5:
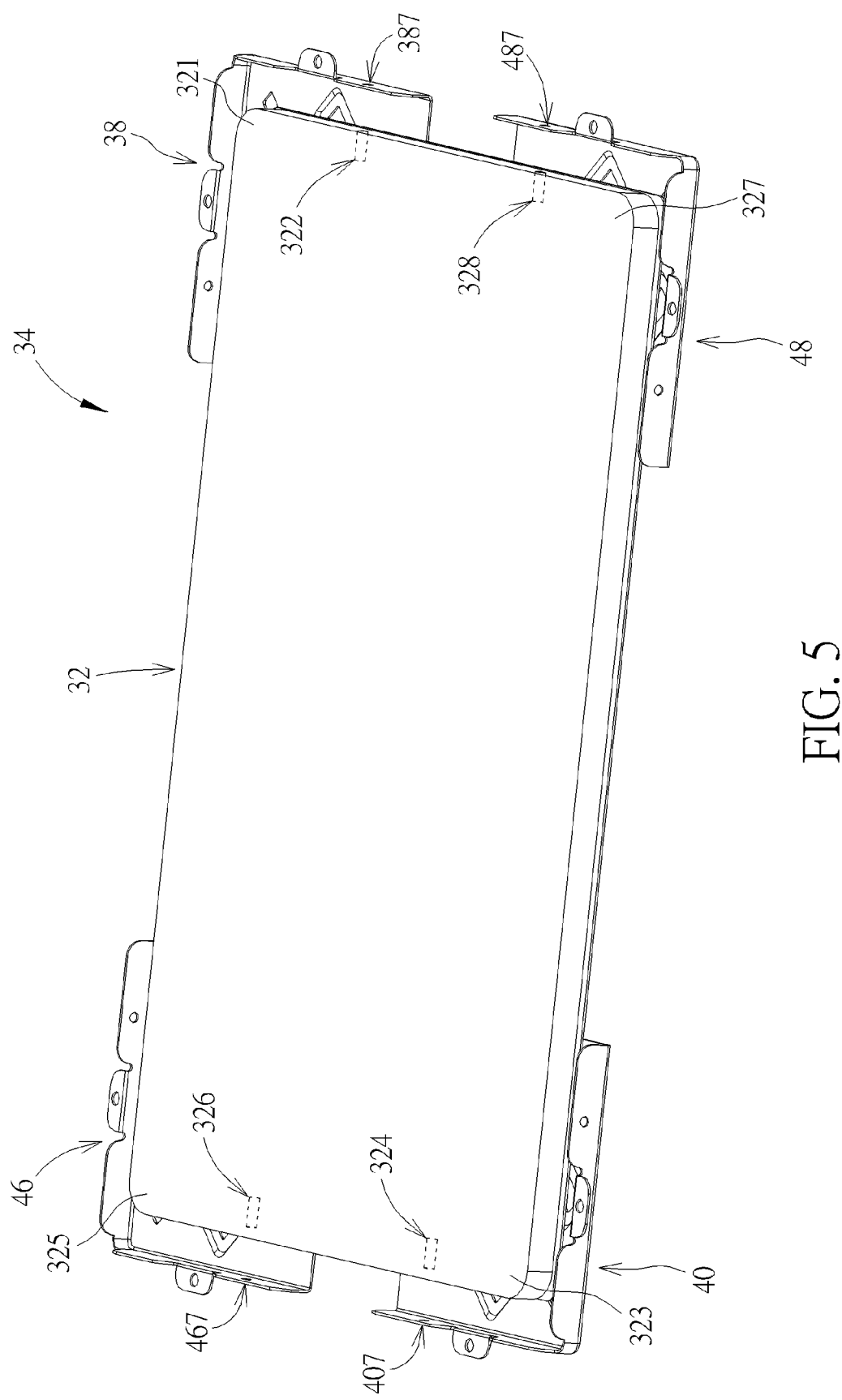
FIG. 5 and FIG. 6 are respectively diagrams of a frame structure in different statuses according to the present invention of the present invention.
Figure 6:
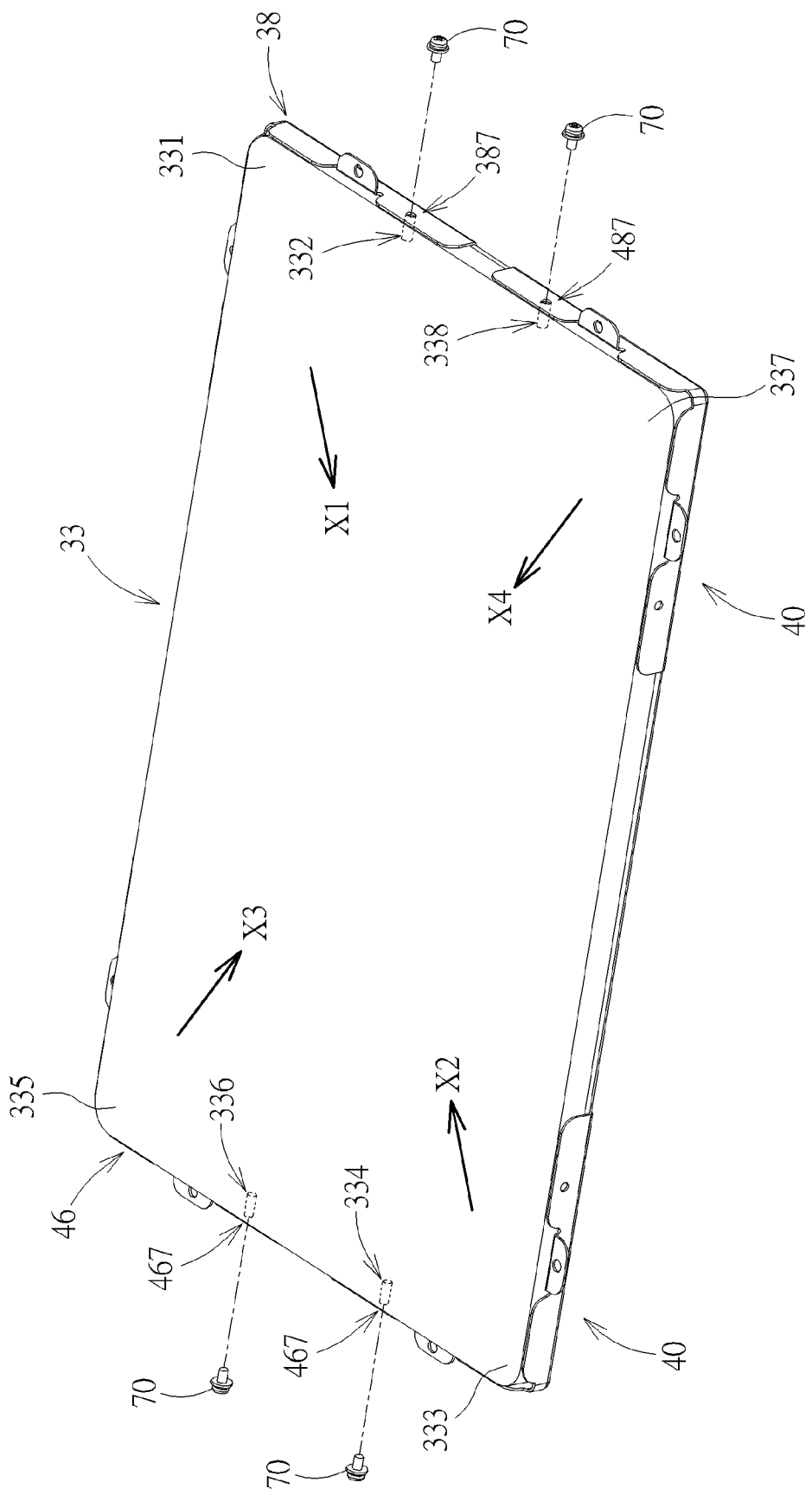

Please refer to FIG. 1, FIG. 5 and FIG. 6. FIG. 5 and FIG. 6 are respectively diagrams of the frame structure 34 in different statuses according to the present invention of the present invention. As shown in FIG. 1, FIG. 5 and FIG. 6, when the first panel 32 is desired to be replaced, the first supporting member 38, the second supporting member 40, the third supporting member 46 and the fourth supporting member 48 are pulled along a direction away from the first panel 32 from a position shown in FIG. 1 to a position shown in FIG. 5. Accordingly, the first panel 32 is capable of detaching from the frame structure 34. Afterwards, a second panel 33 with different sizes is installed on the holding plate 36 of the frame structure 34. Then, release the first supporting member 38, the second supporting member 40, the third supporting member 46 and the fourth supporting member 48.

Meanwhile, the first driving member 54 drives the first supporting member 38 to slide relative to the holding plate 36 along the first direction X1, so as to clamp a first nook 331 of the second panel 33. When the first supporting member 38 clamps the first nook 331 of the second panel 33, the screw component 70 is utilized for screwing at least one first nook hole 332 on the first nook 331 of the second panel 33 after passing through the first screwing hole 387, so as to fix the first supporting member 38 onto the first nook 331 of the second panel 33. The second driving member 56 drives the second supporting member 40 to slide relative to the holding plate 36 along the second direction X2, so as to clamp a second nook 333 of the second panel 33. When the second supporting member 40 clamps the second nook 333 of the second panel 33, the screw component 70 is utilized for screwing at least one second nook hole 334 on the second nook 333 of the second panel 33 after passing through the second screwing hole 407, so as to fix the second supporting member 40 onto the second nook 333 of the second panel 33.

At the same time, the third driving member 58 drives the third supporting member 46 to slide relative to the holding plate 36 along the third direction X3, so as to clamp a third nook 335 of the second panel 33. When the third supporting member 46 clamps the third nook 335 of the second panel 33, the screw component 70 is utilized for screwing at least one third nook hole 336 on the third nook 335 of the second panel 33 after passing through the third screwing hole 467, so as to fix the third supporting member 46 onto the third nook 335 of the second panel 33. The fourth driving member 60 drives the fourth supporting member 480 to slide relative to the holding plate 36 along the fourth direction X4, so as to clamp a fourth nook 337 of the second panel 33. When the fourth supporting member 48 clamps the fourth nook 337 of the second panel 33, the screw component 70 is utilized for screwing at least one fourth nook hole 338 on the fourth nook 337 of the second panel 33 after passing through the fourth screwing hole 487, so as to fix the fourth supporting member 48 onto the fourth nook 337 of the second panel 33.

Compared to the prior art, the first supporting member and the second supporting member of the present invention are slidably disposed on the holding plate, and the first driving member and the second driving member are utilized for driving the first supporting member and the second supporting member to approach the first panel, such that the first supporting member and the second supporting member clamp the first panel. As a result, when the first panel is desired to be replaced, the first supporting member and the second supporting member can be pulled away from the first panel for detaching the first panel from the frame structure. Thus, the second panel with different sizes can be installed onto the holding plate of the frame structure. In such a manner, the frame structure of the present invention can be used for fixing panels with different sizes for saving manufacturing cost of the frame structure, so as to enhance advantages of the product in the market.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A frame structure for fixing panels with different sizes, comprising:
    a holding plate for holding a first panel or a second panel;
    a first supporting member disposed on the holding plate in a slidable manner;
    a first driving member connecting the holding plate and the first supporting member, the first driving member biasing the first supporting member to slide relative to the holding plate along a first direction, the first direction being substantially parallel to the holding plate, so as to clamp a first corner of the first panel or a first nook of the second panel;
    a second supporting member disposed on the holding plate in a slidable manner and opposite to the first supporting member; and
    a second driving member connecting the holding plate and the second supporting member, the second driving member biasing the second supporting member to slide relative to the holding plate along a second direction, the second direction being substantially parallel to the holding plate and opposite to the first direction, so as to clamp a second corner opposite to the first corner of the first panel or a second nook opposite to the first nook of the second panel.

2. The frame structure of claim 1, wherein a first opening is formed on the first supporting member, a second opening is formed on the second supporting member, and the frame structure comprises:
    two first hooks, one of the two first hooks being disposed on the holding plate and installed inside the first opening for hooking an end of the first driving member, the other one of the two first hooks being disposed on the first supporting member for hooking the other end of the first driving member; and
    two second hooks, one of the two second hooks being disposed on the holding plate and installed inside the second opening for hooking an end of the second driving member, the other one of the two second hooks being disposed on the second supporting member for hooking the other end of the second driving member.

3. The frame structure of claim 1, wherein at least one first screwing hole is formed on the first supporting member and corresponds to at least one first corner hole on the first corner of the first panel or to at least one first nook hole on the first nook of the second panel, and at least one second screwing hole is formed on the second supporting member and corresponds to at least one second corner hole on the second corner of the first panel or to at least one second nook hole on the second nook of the second panel.

4. The frame structure of claim 1, wherein at least one first sliding slot is formed on the first supporting member, at least one second sliding slot is formed on the second supporting member, and the frame structure further comprises:
    at least one first guiding structure disposed on the holding plate, the at least one first guiding structure being oriented parallel to the first direction and slidably disposed inside the at least one first sliding slot; and
    at least one second guiding structure disposed on the holding plate and opposite to the at least one first guiding structure, the at least one second guiding structure being oriented parallel to the second direction and slidably disposed inside the at least one second sliding slot.

5. The frame structure of claim 4, wherein a first bending structure is formed on a periphery of the at least one first sliding slot, and the at least one first guiding structure comprises:
    a first protruding portion protruding from the holding plate and for slidably abutting against the first bending structure; and
    a first engaging portion protruding from the first protruding portion and for slidably engaging with the first bending structure.

6. The frame structure of claim 5, wherein a second bending structure is formed on a periphery of the at least one second sliding slot, and the at least one second guiding structure comprises:
    a second protruding portion protruding from the holding plate and for slidably abutting against the second bending structure; and
    a second engaging portion protruding from the second protruding portion and for slidably engaging with the second bending structure.

7. The frame structure of claim 1, further comprising:
    a third supporting member disposed on the holding plate in a slidable manner and adjacent to the first supporting member and the second supporting member; and
    a third driving member connecting the holding plate and the third supporting member and biasing the third supporting member to slide relative to the holding plate along a third direction, so as to clamp a third corner of the first panel or a third nook of the second panel.

8. The frame structure of claim 7, wherein a third opening is formed on the third supporting member, and the frame structure further comprises:
    two third hooks, one of the two third hooks being disposed on the holding plate and installed inside the third opening for hooking an end of the third driving member, the other one of the two third hooks being disposed on the third supporting member for hooking the other end of the third driving member.

9. The frame structure of claim 7, wherein at least one third screwing hole is formed on the third supporting member and corresponds to at least one third corner hole on the third corner of the first panel or to at least one third nook hole on the third nook of the second panel.

10. The frame structure of claim 7, wherein at least one third sliding slot is formed on the third supporting member, and the frame structure further comprises:
    at least one third guiding structure disposed on the holding plate, the at least one third guiding structure being oriented parallel to the third direction and slidably disposed inside the at least one third sliding slot.

11. The frame structure of claim 10, wherein a third bending structure is formed on a periphery of the at least one third sliding slot, and the at least one third guiding structure comprises:
    a third protruding portion protruding from the holding plate and for slidably abutting against the third bending structure; and
    a third engaging portion protruding from the third protruding portion and for slidably engaging with the third bending structure.

12. The frame structure of claim 7, further comprising:
    a fourth supporting member disposed on the holding plate in a slidable manner and opposite to the third supporting member; and
    a fourth driving member connecting the holding plate and the fourth supporting member and biasing the fourth supporting member to slide relative to the holding plate along a fourth direction opposite to the third direction, so as to clamp a fourth corner opposite to the third corner of the first panel or a fourth nook opposite to the third nook of the second panel.

13. The frame structure of claim 12, wherein a fourth opening is formed on the fourth supporting member, and the frame structure further comprises:
two fourth hooks, one of the two fourth hooks being disposed on the holding plate and installed inside the fourth opening for hooking an end of the fourth driving member, the other one of the two fourth hooks being disposed on the fourth supporting member for hooking the other end of the fourth driving member.

14. The frame structure of claim 12, wherein at least one fourth screwing hole is formed on the fourth supporting member and corresponds to at least one fourth corner hole on the fourth corner of the first panel or to at least one fourth nook hole on the fourth nook of the second panel.

15. The frame structure of claim 12, wherein at least one fourth sliding slot is formed on the fourth supporting member, and the frame structure further comprises:
at least one fourth guiding structure disposed on the holding plate and opposite to the at least one third guiding structure, the at least one fourth guiding structure being oriented parallel to the fourth direction and slidably disposed inside the at least one fourth sliding slot.

16. The frame structure of claim 15, wherein a fourth bending structure is formed on a periphery of the at least one fourth sliding slot, and the at least one fourth guiding structure comprises:
a fourth protruding portion protruding from the holding plate and for slidably abutting against the fourth bending structure; and
a fourth engaging portion protruding from the fourth protruding portion and for slidably engaging with the fourth bending structure.

17. A panel device, comprising:
a first panel; and
a frame structure for fixing the first panel, comprising:
a holding plate for holding the first panel;
a first supporting member disposed on the holding plate in a slidable manner;
a first driving member connecting the holding plate and the first supporting member, the first driving member biasing the first supporting member to slide relative to the holding plate along a first direction, the first direction being substantially parallel to the holding plate, so as to clamp a first corner of the first panel;
a second supporting member disposed on the holding plate in a slidable manner and opposite to the first supporting member; and
a second driving member connecting the holding plate and the second supporting member, the second driving member biasing the second supporting member to slide relative to the holding plate along a second direction, the second direction being substantially parallel to the holding plate and opposite to the first direction, so as to clamp a second corner opposite to the first corner of the first panel.

18. The panel device of claim 17, wherein the frame structure further comprises:
a third supporting member disposed on the holding plate in a slidable manner and adjacent to the first supporting member and the second supporting member; and
a third driving member connecting the holding plate and the third supporting member and the third supporting member to slide relative to the holding plate along a third direction, the third direction being substantially parallel to the holding plate, so as to clamp a third corner of the first panel.

19. The panel device of claim 18, wherein the frame structure further comprises:
a fourth supporting member disposed on the holding plate in a slidable manner and opposite to the third supporting member; and
a fourth driving member connecting the holding plate and the fourth supporting member and biasing the fourth supporting member to slide relative to the holding plate along a fourth direction opposite to the third direction, so as to clamp a fourth corner opposite to the third corner of the first panel.

20. The panel device of claim 17, wherein the holding plate is further for holding a second panel with a size different from a size of the first panel, the first driving member further drives the first supporting member to slide relative to the holding plate along the first direction, so as to clamp a first nook of the second panel, and the second driving member further drives the second supporting member to slide relative to the holding plate along the second direction, so as to clamp a second nook opposite to the first nook of the second panel.

* * * * *